Aug. 8, 1933.  M. L. DARR  1,921,662
ROTARY STEAM ENGINE
Filed Sept. 10, 1930   2 Sheets-Sheet 1
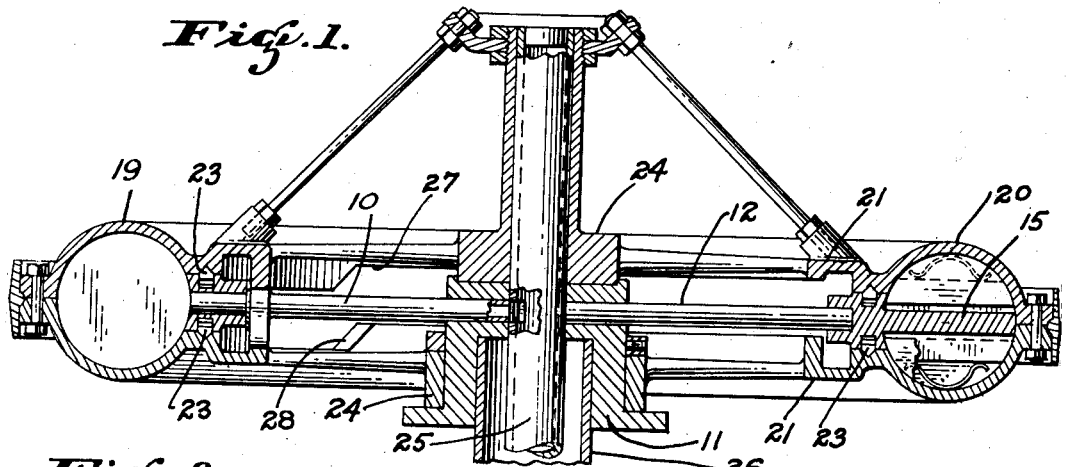
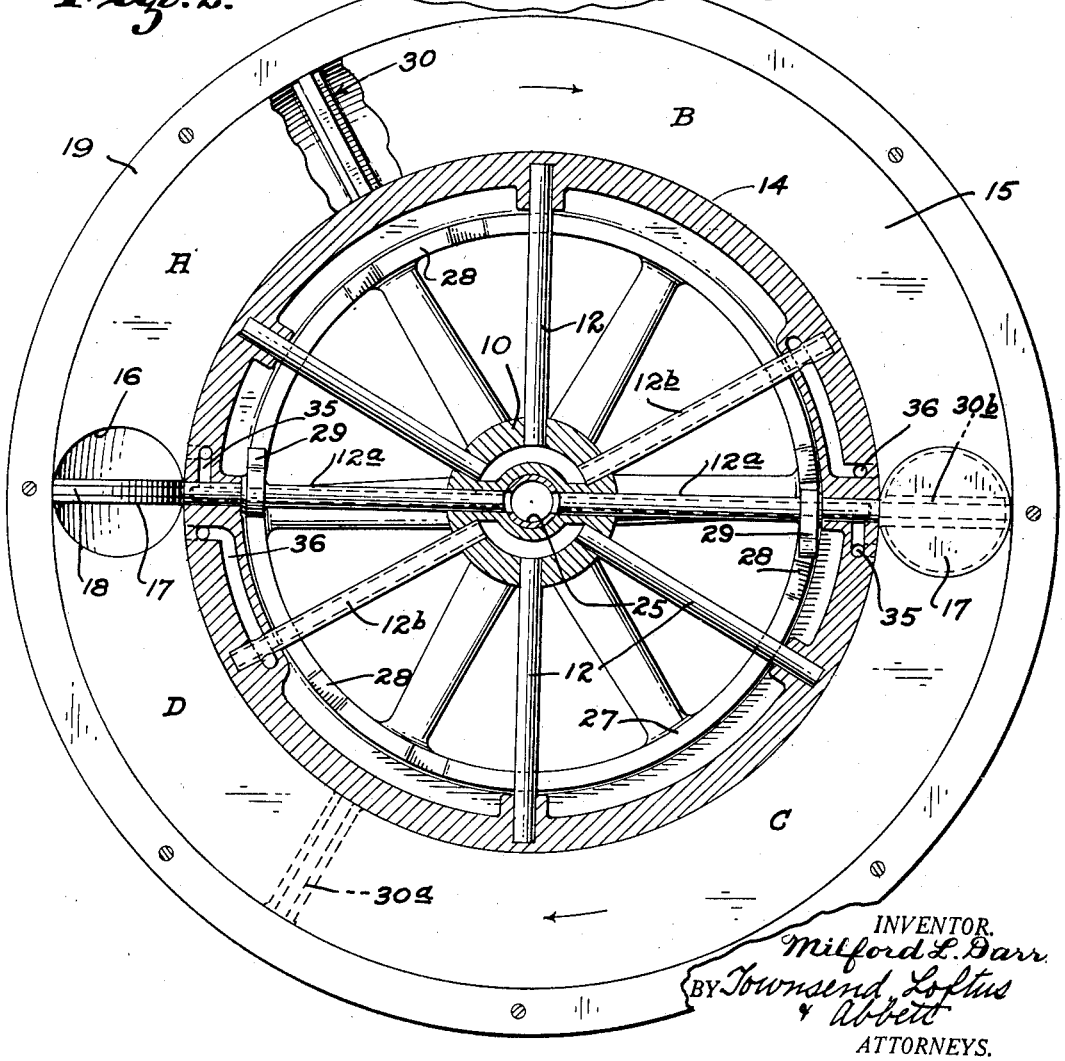
INVENTOR.
Milford L. Darr.
BY Townsend Loftus
& Abbett
ATTORNEYS.

Aug. 8, 1933.  M. L. DARR  1,921,662
ROTARY STEAM ENGINE
Filed Sept. 10, 1930   2 Sheets-Sheet 2
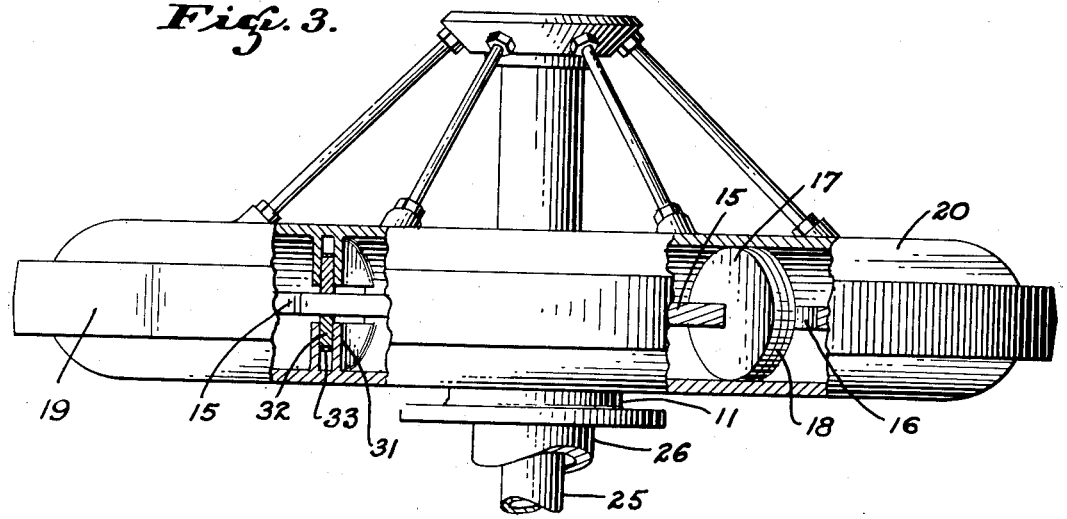
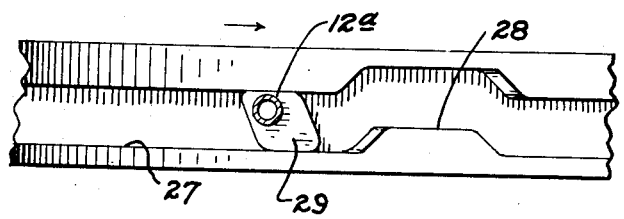
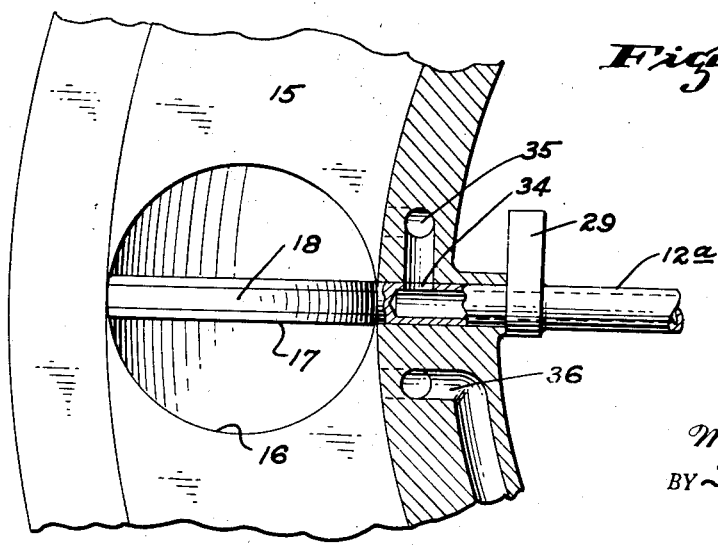
INVENTOR.
Milford L. Darr.
BY Townsend Loftus
& Abbett
ATTORNEYS.

Patented Aug. 8, 1933

1,921,662

UNITED STATES PATENT OFFICE 1,921,662

ROTARY STEAM ENGINE

Milford L. Darr, Oakland, Calif.

Application September 10, 1930
Serial No. 480,877

2 Claims. (Cl. 121—56)

This invention relates to rotary steam engines and has for its principal object the provision of a simple but efficient rotary motor of the type employing an expanding fluid as an operating medium.

In carrying the invention into practice I provide a rotor which includes a circular cylinder divided into compartments by means of vanes. The rotor revolves about a stator carrying a pair of abutments which cooperate with the vanes on the rotor so that the action of the expansive vapor injected between the stator abutments and rotor vanes at correctly timed intervals will cause revolution of the rotor. The construction of the cylinder and vanes is such that the vanes in the rotor may pass the abutments carried by the stator so that the motor may operate in continuous cycles.

One form which the invention may assume is exemplified in the following description and illustrated by way of example in the accompanying drawings, in which:

Fig. 1 is a central section taken coaxially through the motor.

Fig. 2 is a plan section taken transversely through the rotor and stator.

Fig. 3 is a side elevation of the motor with parts broken away to more clearly disclose certain features of construction.

Fig. 4 is a fragmentary view showing the construction of the cam ring which operates the stator abutments.

Fig. 5 is a fragmentary view in plan section through the rotor and stator showing the manner in which the operation of the stator abutments controls the injection of the expansible fluid.

Referring more particularly to the accompanying drawings, 10 indicates a stator having a hub section 11 from which radiate tubular arms 12 fixed to the outer ends of which is a circular packing section 14. Formed integrally with this circular packing section 14 is an annular cylinder division wall 15 which is circular in form and which extends about the entire outer periphery of the packing section 14 centrally thereof as illustrated in Fig. 1.

At diametrically opposed points on the cylinder division wall 15 it is formed with circular openings 16 within which are mounted circular stator abutments 17, the outer periphery of each being fitted with a packing ring 18. These stator abutments 17 are rotatable in the openings 16 so that they may be disposed in the plane of the wall 15 tightly fitting the opening 16 with their surfaces flush with the surfaces of the wall 15 or at right angles thereto as will be described.

Arranged concentrically of the stator 10 is a rotor 19 having a circular cylinder 20 enclosing the packing section and division wall of the stator. This cylinder is cylindrical in cross section and has a bore of a diameter agreeing with the width of the wall 15 which is disposed centrally thereof and also agreeing with the diameter and contour of the stator abutments 17. At its inner periphery the cylinder 20 has a rim portion 21 embracing the packing section 14 of the stator. Between adjacent surfaces of the rim section 21 and packing section 14 packing rings 23 are provided which are circular and which are spring-pressed into engagement with grooves in the rim section of the cylinder so as to prevent the escape or leakage of fluid from the interior of the cylinder to the atmosphere.

The rim section 21 of the cylinder 20 is connected by spokes or other suitable means to hubs 24, one of which is revolubly mounted on a stationary intake tube 25 and the other of which is revolubly mounted on the stationary hub 11 of the stator. Projecting within the hub 11 of the stator is an exhaust tube 26 through which the intake tube 25 telescopes. Both of these tubes are, of course, stationary and as the connection between the tube 25, the source of expanding fluid supply, and the connection between the exhaust tube 26 and auxiliary mechanism forms no part of the present invention it has not been illustrated.

It will be noticed from Figs. 1 and 4 that the inner periphery of the rim section 21 of the cylinder 20 is formed with a pair of annular flanges cooperating to form a circular cam groove 27 having three offsets 28 therein. Each of the stator abutments 17 is mounted on a rotatable spoke 12a having a cam shoe 29 fixed thereon which operates in the cam groove 27 so that as the cylinder revolves, the stator abutments will be operated at proper intervals.

Arranged within the cylinder 20 are three cylinder vanes 30, 30a, and 30b, disposed at right angles to the cylinder axis and spaced at equal distances apart about the interior of the cylinder. Reference being had to Fig. 3 it will be seen that the vanes are formed in two halves in order to accommodate the wall 15 on the stator. Each half comprises a recessed wall 31 formed as a part of the cylinder and between which is a packing member 32 spring-pressed by means of a spring 33 into engagement with the adjacent surface of the wall 15 to form a fluid tight joint therebetween.

In order to direct the expanding fluid into the cylinder at the proper intervals and to exhaust the same, the spokes 12a, which are hollow and revoluble and which act as the shafts for the stator abutments 17, are connected with the intake tube 25. At the end of these spokes where they project into the packing section 14 they are each formed with a port 34 which are adapted to be out of register with intake ports 35 in the packing section 14 when the stator abutments 17 are disposed in the same plane as the wall 15. When the stator abutments 17 are disposed at right angles to the plane of the wall 15, the ports 34 will be in register with the ports 35 so that the operating fluid will be admitted to the cylinder.

In order to exhaust the cylinder at the proper intervals, at the side of the abutments 17 opposite the intake ports 35, the packing section of the stator is formed with exhaust ports 36 which communicate with hollow spokes 12b, these spokes in turn communicating with the interior of the exhaust tube 26.

In operation of the device, it is constructed as shown in the drawings and the outer periphery of the cylinder 20 is fitted with a pulley or other driving element so that the energy developed may be transmitted as desired.

Assuming that the rotor vanes are in the position illustrated in Fig. 2, it will be seen that the cylinder 20 will be divided into compartments A, B, C and D. In the compartment A the intake ports 34 and 35 will be in register so that expanding fluid will be admitted and will act between the stationary stator abutment 17 and the rotor vane 30, causing the latter to move in the direction of the arrow and impart rotation to the rotor. It will be seen that fluid will pass through the openings 16 so that fluid will be admitted to both chambers of the cylinder equally. However, as the vane 30a moves toward the stator abutment 17, the offset 28 in the cam will move the stator abutment 17 to a position in the plane of the wall 15. When in this position, the ports 34 and 35 are out of register which occurs while the rotor vanes pass over the stator abutments as illustrated at the right-hand side of Fig. 2 where it is shown that the vane 30b is passing over the stator abutment 17.

Just after the vanes 30 pass over the stator abutment 17 the cam actuates the stator abutments to again place the intake ports 34 and 35 in register to admit the expanding fluid to the compartments and impart rotation thereby to the rotor. However, as soon as the intake portion of the cycle is completed, the compartments will be exhausted through the exhaust ports 36 as the vanes move toward the succeeding stator abutment 17.

It is obvious that by my novel construction I am able to maintain leakage between the moving parts at a minimum so that my motor will be efficient in operation.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A rotary motor comprising a stator having a packing section, a flat annular wall about the perimeter of said packing section, a rotor mounted concentric with relation to the stator and having a circular cylinder enclosing said wall whereby the latter will divide the cylinder along its axis, a rim section on the cylinder embracing the packing section, packing means between the rim section of the cylinder and the packing section of the stator, said wall having a plurality of openings formed therein, a rotatable abutment in each opening conforming to the contour thereof and to the contour of the bore of the cylinder, said rotatable abutments being of a thickness agreeing with the thickness of the wall and so mounted that they may lie in the same plane as the wall with the surfaces thereof flush with the surfaces of the wall, a plurality of vanes fixed in the cylinder and arranged at right angles to the axis thereof and spaced equal distances apart about the circumference of the cylinder to divide the space between the wall and the interior surface of the cylinder, a pair of annular flanges on the rotor cooperating to form a cam track, a cam shoe fixed with relation to the axis of each rotatable abutment and adapted to cooperate with said track whereby the rotatable abutments will be in the plane of the wall when they register with the cylindrical vanes and at right angles to the plane of the wall while out of register with the cylinder vanes.

2. A rotary motor comprising a rotor including a circular cylinder, a stator dividing the cylinder along the axis thereof, said stator having a pair of diametrically opposed openings formed therein within the cylinder, a rotatable abutment in each opening conforming the contour thereof and to the contour of the bore in the cylinder, a plurality of vanes fixed in the cylinder and arranged at right angles to the axis thereof and dividing the cylinder into a plurality of compartments, cam means automatically operating the rotatable abutments to place them in the same plane with the stator when the cylinder vanes register therewith and position them at right angles to the stator when the cylinder vanes are out of register therewith, a hollow rotatable shaft fixed to each of said rotatable abutments, means to deliver fluid through said shafts to the interior of said cylinder, said stator and said hollow rotatable shafts having cooperating ports formed therein which are placed in register at properly timed intervals by rotation of said shafts to control the flow of fluid to the cylinder.

MILFORD L. DARR.